United States Patent [19]
Prytherch

[11] Patent Number: 5,235,402
[45] Date of Patent: Aug. 10, 1993

[54] SPECTROMETER

[75] Inventor: Huw Prytherch, Cambridge, England

[73] Assignee: U.S. Philips Corp., New York, N.Y.

[21] Appl. No.: 795,166

[22] Filed: Nov. 18, 1991

[30] Foreign Application Priority Data

Nov. 21, 1990 [GB] United Kingdom ............... 9025345

[51] Int. Cl.$^5$ .............................................. G01J 3/28
[52] U.S. Cl. .................................. 356/326; 356/328; 356/305
[58] Field of Search ............... 356/326, 328, 302, 305, 356/308; 357/24; 307/246, 227; 377/60, 63

[56] References Cited

U.S. PATENT DOCUMENTS 4,004,163 1/1977 Spence ............................... 307/246

OTHER PUBLICATIONS

"Optimizing Charge-Coupled Device Detector Operation for Optical Astronomy" Optical Engineering, Oct. 1987, vol. 26 No. 10, pp. 1061-1066.

"Intensified Charge-Coupled Device Cameras for a Spatially Resolving Extreme Ultraviolet Spectrometer" Optical Engineering, Aug. 1987, vol. 26, No. 8 pp. 806-812.

"Charge Transfer Device Detectors for Analytical Optical Spectroscopy—Operation and Characteristics" Applied Spectroscopy, vol. 41, Nov. 1987 pp. 1114-1125.

*Primary Examiner*—Vincent P. McGraw
*Assistant Examiner*—K. P. Hantis
*Attorney, Agent, or Firm*—William L. Botjer

[57] ABSTRACT

In a spectrometer using a two dimensional CCD array as a detector a column or a substantial part of a column of pixels is used to detect radiation of a given wavelength. The output circuit (52) of the CCD is modified by taking the drain electrode of the pixel reset transistor (T1) to the reference voltage (VR) via a further transistor (T3) which is controlled by a column reset signal applied to input (63). A further capacitor (C2) is connected in parallel with the internal binning capacitor (C1) through transistor (T1). Since the further capacitor (C2) is "off chip" it can be made much larger than the binning capacitor (C1) thus allowing a whole column of pixels to be binned enabling a reduction in read-out noise.

4 Claims, 2 Drawing Sheets

SPECTROMETER

BACKGROUND OF THE INVENTION

The invention relates to a spectrometer comprising means for directing radiation emanating from or passing through a sample onto a radiation detector, signal processing means for processing the signal produced by the radiation detector, and display means for displaying the processed signal, wherein the detector comprises an m column by n row array of charge coupled devices, means for accumulating the charges from a plurality of devices on an output capacitor, and means for producing an output signal representing the charge on the output capacitor.

Such a spectrometer is described in the following three papers.

1) Charge Transfer Device Detectors for Analytical Optical Spectroscopy—Operation and Characteristics by R. B. Bilhorn, J. V. Sweedler, P. M. E. Epperson, and M. B. Denton; published in Applied Spectroscopy, Volume 41, Number 7, 1987, pages 1114 to 1125:

2) Intensified charged-coupled-device cameras for a spatially resolving extreme ultraviolet spectrometer by D. Content, M. Perry, D. Wroblewski, and H. W. Moor; published in Optical Engineering, Volume 26, Number 8, August 1987, pages 806 to 812: and 3) Optimising charge-coupled-device detector operation for optical astromony by Robert W. Leach; published in Optical Engineering, Volume 26, Number 10, October 1987, pages 1061 to 1066. They all refer to the advantage of charge coupled device (CCD) detectors in that a read-out mode in which the charge from more than one detector element can be combined within the CCD before being read out. This process is called binning. The advantage of summing the analogue signal "on chip", as compared with digital summing in memory, is that the summed charge is subject to only one read operation and as a result has only the noise associated with one read operation; whereas digitally summing the data also sums the noise associated with each read out operation.

This technique can only be applied where either a small number of detector elements which accumulate a maximum charge are binned or if a large number of detector elements are binned each detector element can only accumulate a small charge. This is because in one direction of the array the shift register can only hold a small amount of charge, typically between one and five times the maximum detector element charge, and in the other direction the output capacitor has a small charge handling capacity, again typically not more than five times a shift register stage charge.

SUMMARY OF THE INVENTION

It is an object of the invention to improve the performance of a CCD detector for spectrometers.

The invention provides a spectrometer as set forth in the opening paragraph characterised in that a further, external, capacitor is connected in parallel with said output capacitor.

CCDs are commonly used for capturing the image in video cameras and are commonly made in arrays of 600 by 575 detector elements (or pixels in television terminology), see for example the Philips NXA 1001 solid state image sensor. Typically a polychromator disperses the radiation and causes a narrowband of wavelengths to illuminate each column of the detector. In order to obtain maximum sensitivity it is desirable to use all or a substantial proportion of the elements of a column to detect radiation of the narrow band of wavelengths. This means that for wavelengths where the absorbance of a sample is low or the radiation emitted by the sample is intense and hence the energy falling on the detector is high each detector element in a column will accumulate a large charge and consequently binning on the output capacitor of the CCD becomes impossible. Possible alternatives are to restrict the energy of the radiation so that no detector element accumulates a large charge regardless of the absorbance of the sample or the integration time or to read out individual or a small number of detector elements and sum them digitally. The first alternative suffers from the disadvantage that when there is significant sample absorbance the radiation received by the detector will be very low and hence will result in reduced sensitivity and increased noise. The second alternative has the disadvantage of increasing the read out noise as discussed hereinbefore. By adding extra external capacitance it is possible to sum the charges from many picture elements as the external capacitor can be made much larger than the "on chip" output capacitor provided in the CCD. Thus the invention allows the use of low cost standard CCD chips designed for consumer applications such as video cameras as detectors for spectrometers and enables the signal to be read out with a minimum of added noise. The charges from a complete column of detector elements may be accumulated on said capacitors and the output signal produced when said charges have been accumulated. This enables a maximum sensitivity of measurement since when low level signals are received at the detector a large detector area is available which maximises the total radiation received and for signal shot noise limited operation as the signal increases the noise increases as the square root of the signal and hence the signal to noise ratio is increased.

The charges from a selected number of the detector elements of a column may be accumulated on said capacitors and the output signal produced when said charges have been accumulated. This enables a standard array to be tailored to the optical system being used i.e. only those elements which are illuminated by the measurement beam are read out, it being a relatively straightforward process to select those elements enabling easy accommodation of different sized samples where the measurement beam may be altered in size in order to improve measurement performance.

The spectrometer may include a transistor connected to the parallel arrangement of said capacitors and control means for controlling the transistor to cause it to reset the capacitors to a given state of charge when the output signal has been produced.

By this means minimal change is required to the normal operation of a CCD chip. The pixel reset transistor is isolated from the reference supply and instead of resetting the internal capacitor it causes charge sharing between the internal and external capacitors. The resetting function is then performed by the external transistor which serves to isolate the internal transistor from the reference voltage source used to reset the capacitors to a given charge state.

BRIEF DESCRIPTION OF THE DRAWING

The above and other features and advantages of the invention will be apparent from an embodiment of the invention which will now be described, by way of example, with reference to the accompanying drawings, in which.

DETAILED DESCRIPTION OF THE PREFERRED EMBODIMENT

Figure 1:
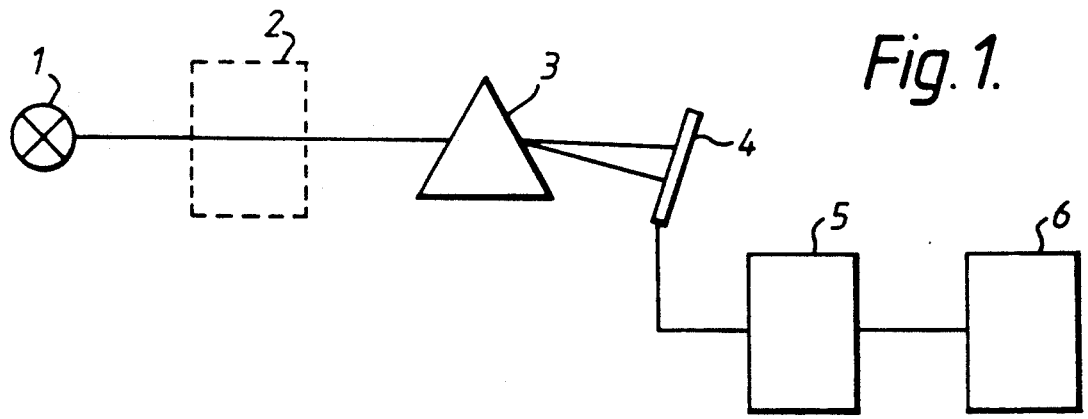
FIG. 1 shows in block schematic form one embodiment of a spectrometer according to the invention.

As shown in FIG. 1 the spectrometer comprises a radiation source 1 which emits wideband radiation. Many such sources are known, for example tungsten filament lamps for visible wavelengths or deuterium lamps for ultra violet (UV) wavelengths. The radiation from the source 1 is directed through a sample compartment 2 onto a dispersing element 3. Conventionally the radiation is directed through the sample compartment by appropriate optical means, mirrors and/or lenses, onto the dispersing means which may be a prism or a diffraction grating. Again appropriate optical elements are used to collimate and focus the radiation beam where appropriate. The dispersed radiation beam is directed onto a detector 4 which comprises a charge coupled device array. The detector 4 comprises a regular array of m rows by n columns of charge coupled devices as is conventionally used in television cameras. A control and signal processing circuit 5 provides the necessary signals to read the output of the detector 4 and processes the signal read out for display on a display device 6. The display devices 6 may take any convenient form, for example video display unit, chart recorder, X-Y plotter, etc.

Figure 2:
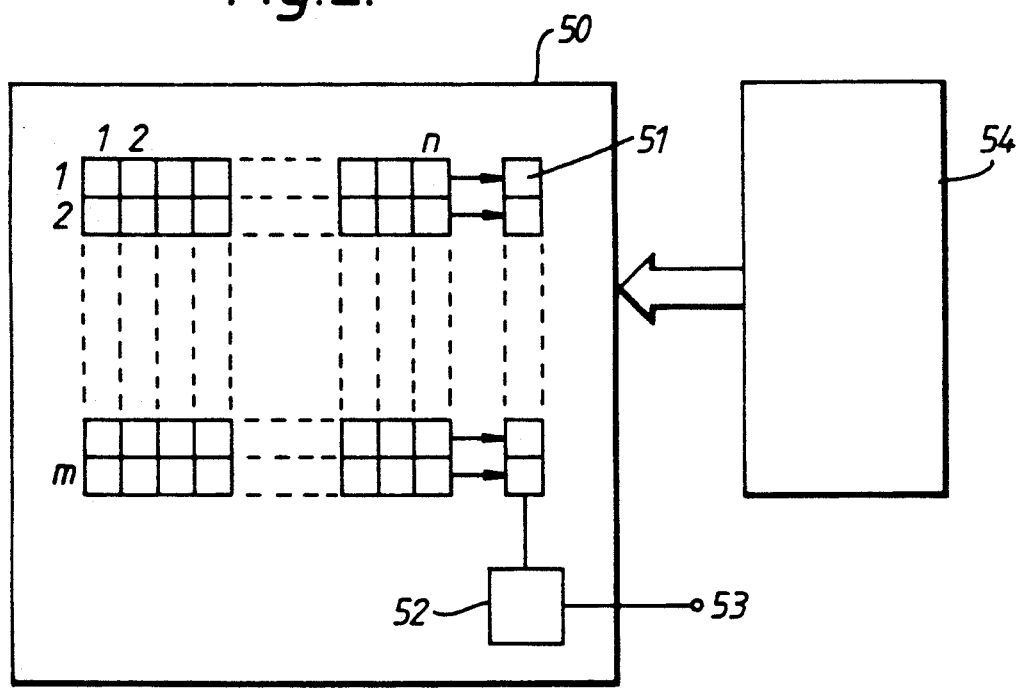
FIG. 2 shows in block schematic form a detector comprising a charge coupled device array and control circuitry.

FIG. 2 shows the detector 4 which is in the form of a charge coupled device in the form of an array 50 having n columns of m charge coupled devices. An output shift register 51 is connected to an output circuit 52 which produces an output signal at an output terminal 53. The detector 4 may comprise a commercially available CCD array and has associated with it control circuitry 54 to enable the charge to be accumulated and readout. Details of such control circuitry are readily available, for example in a data handbook entitled Solid State Image Sensors and Peripheral Integrated Circuits published by Philips Components (Book PC11, 1989). The control circuitry produces appropriate clocking and readout signals which cause the charges from each device to be read in sequence one column at a time in parallel into the shift register 51 from where it is shifted serially into the output circuit 52 from which it is fed to output 53 for connection to the control and processing circuit 5.

Figure 3:
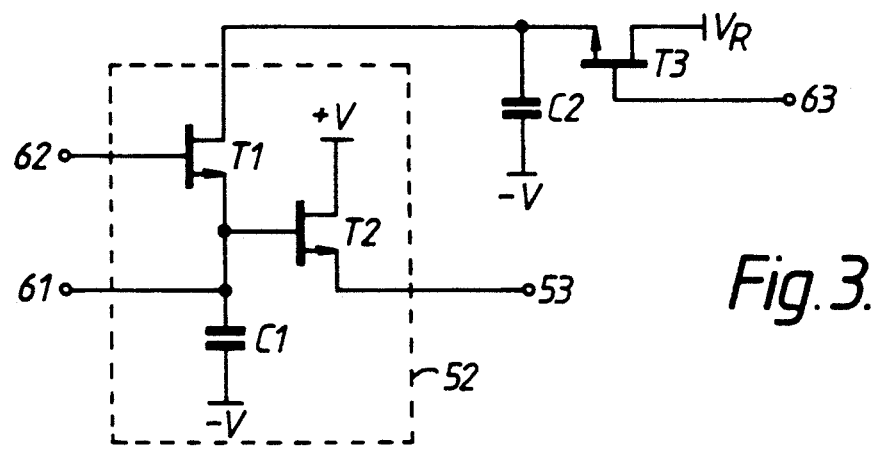
FIG. 3 shows a circuit diagram of the read out circuit of the detector show in FIG. 1.

FIG. 3 shows how the output circuit 52 is modified to allow binning of all the charges in a column or of a substantial portion of them regardless of the charge accumulated by each of the elements. The dotted box 52 represents the output circuit shown in FIG. 3. A first input 61 is connected to the junction of a capacitor C1 and the source electrode of an n-channel field effect transistor T1 and also to the gate electrode of an n-channel field effect transistor T2. The other end of the capacitor C1 is connected to a negative supply rail $-V$ while the drain electrode of transistor T2 is connected to a positive supply rail $+V$. The drain electrode of transistor T1 is connected to the junction of a capacitor C2 and the source electrode of an n-channel field effect transistor T3. The other end of capacitor C2 is connected to the negative supply rail $-V$ while the drain electrode of transistor T3 is connected to the gate electrode of transistor T1 while a third input 63 is connected to the gate electrode of transistor T3. The source electrode of transistor T2 is connected to the output terminal 53.

In operation charges from the shift register 51 are fed to the first input 61 while a pixel reset control signal is fed to the second input 62. A column reset control signal is fed to the third input 63. Normally the drain electrode of transistor T1 would be connected directly to the reference voltage $V_R$ and consequently when the pixel reset pulses are received this would reset the charge on capacitor C1 to a given value. This charge is then incremented by each of the charge packets received from the shift register 51 at input 61. The pixel reset pulses are normally applied after receipt of each charge packet so that a series of pulses are produced at output 53 which correspond in magnitude to the magnitude of the individual charge packets. However, by reducing the frequency of the pixel reset pulses it is possible to accumulate a limited number of charge packets on the capacitor C1. The number is limited by the value of the capacitor C1, which cannot conveniently be made large by integrated circuit techniques, and the size of the charge packets, i.e. if it can be ensured that only a small charge accumulates on each element of the array then a greater number can be accumulated on capacitor C1.

The arrangement shown in FIG. 3 includes transistor T3 and capacitor C2 connected externally to the CCD array such that the transistor T3 is connected between the reference source $V_R$ and the drain electrode of transistor T1. Transistor T3 is controlled by a column reset signal applied to terminal 63 and isolates transistor T1 from the reference source $V_R$ except when the reset signal is present. Consequently as each charge packet is received it accumulates on capacitors C1 and C2 which are connected in parallel when transistor T1 is switched on by the pixel reset pulses. Capacitor C2 can be chosen to be much larger than capacitor C1 as it is realised as a discrete component. This charge is accumulated on the parallel combination of capacitors C1 and C2 and a whole column of CCDs can be binned in this combination even when all the elements have accumulated their maximum charge.

Figure 4:
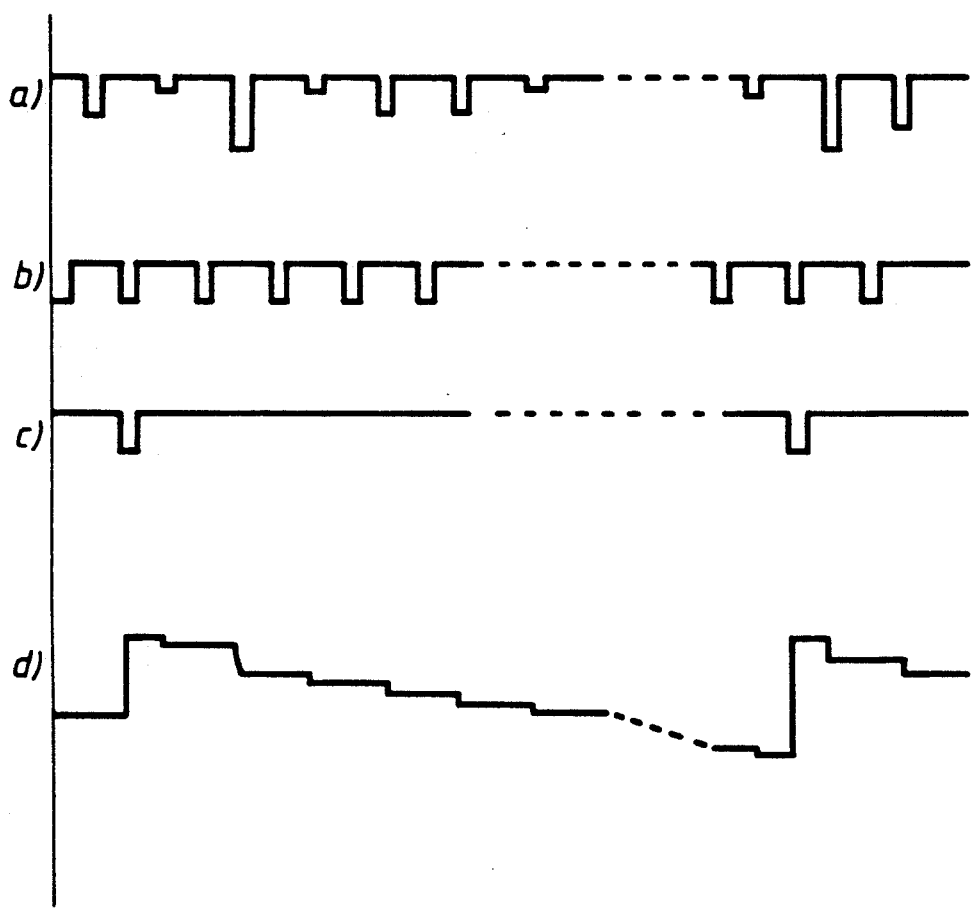
FIG. 4 shows waveforms useful for understanding the operation of the read out circuit shown in FIG. 3.

FIG. 4 is a timing diagram showing in FIG. 4a) the charge packets applied to input 61, in FIG. 4b) the pixel reset pulses applied to input 62, in FIG. 4c) the column reset pulses applied to input 63, and in FIG. 4d) the output signal at terminal 53.

It is also possible to connect the gate electrode to transistor T1 in terminal 62 to a constant bias potential so that transistor T1 is continuous by conducting and thus permanently connects capacitors C1 and C2 in parallel, the combination of capacitors C1 and C2 being set to the given charge by the column reset pulses. This has the advantage of reducing inaccuracies caused by the switching of transistor T1 which has parasitic capacitance associated with it. In this case the waveform shown in FIG. 4(b) would be replaced by a constant bias level.

While the embodiment shown in FIG. 1 is a typical construction of an optical spectrometer used for measuring the absorbance or transmittance of a sample by passing radiation from a source through a sample to a detector the invention is also applicable to spectrometers where the detector receives radiation emitted by the sample either by direct emission such as in atomic emission spectrometers or by emission in response to exciting radiation such as in X-ray fluorescence or atomic fluorescence spectrometers.

From reading the present disclosure, other modifications will be apparent to persons skilled in the art. Such modifications may involve other features which are already known in the design, manufacture and use of analytical instruments and components parts thereof and which may be used instead of or in addition to features already described herein.

I claim:

1. A spectrometer comprising means for directing radiation emanating from or passing through a sample onto a radiation detector, signal processing means for processing the signal produced by the radiation detector, and display means for displaying the processed signal, wherein the detector comprises an m column by n row array of charge coupled devices, means for accumulating the charges from a plurality of the devices on an internal output capacitor, and means for producing an output signal representing the charge on the internal output capacitor characterized in that a further external capacitor is connected in parallel with said internal output capacitor.

2. A spectrometer as claimed in claim 1 in which the charges from a complete column of detector elements are accumulated on said capacitors, the output signal being produced when said charges have been accumulated.

3. A spectrometer as claimed in claim 1 in which the charges from a selected number of the detector elements of a column are accumulated on said capacitors, the output signal being produced when said charges have been accumulated.

4. A spectrometer as claimed in claim 1 comprising a transistor connected to the parallel arrangement of said capacitors and control means for controlling the transistor to cause it to reset the capacitors to a given state of charge when the output signal has been produced.

* * * * *